(12) United States Patent
Larosa et al.

(10) Patent No.: US 11,163,672 B2
(45) Date of Patent: Nov. 2, 2021

(54) TEST SUITE GENERATION FROM METADATA

(71) Applicant: salesforce.com, inc., San Francisco, CA (US)

(72) Inventors: Julio Alejandro Larosa, Buenos Aires (AR); Ignacio Bottero, Buenos Aires (AR); Mauro Dentoni, Buenos Aires (AR); Maria Mare, Ciudad Autónoma de Buenos Aires (AR); Nicolas Grossi, Buenos Aires (AR)

(73) Assignee: salesforce.com, inc., San Francisco, CA (US)

(*) Notice: Subject to any disclaimer, the term of this patent is extended or adjusted under 35 U.S.C. 154(b) by 0 days.

(21) Appl. No.: 16/778,660

(22) Filed: Jan. 31, 2020

(65) Prior Publication Data
US 2021/0240600 A1  Aug. 5, 2021

(51) Int. Cl.
*G06F 11/36* (2006.01)
*G06F 9/54* (2006.01)
*G06Q 10/10* (2012.01)

(52) U.S. Cl.
CPC .......... *G06F 11/3684* (2013.01); *G06F 9/547* (2013.01); *G06F 11/3688* (2013.01); *G06Q 10/105* (2013.01)

(58) Field of Classification Search
CPC .. G06F 11/3684; G06F 11/3688; G06F 9/547; G06Q 10/105
See application file for complete search history.

(56) References Cited

U.S. PATENT DOCUMENTS

| 8,949,792 | B2* | 2/2015 | Paterson | G06F 11/3684 717/124 |
| 2012/0059919 | A1* | 3/2012 | Glaser | G06F 11/3664 709/223 |
| 2014/0075242 | A1* | 3/2014 | Dolinina | G06F 11/3672 714/27 |
| 2018/0357154 | A1* | 12/2018 | Dolby | G06F 11/3684 |
| 2019/0188121 | A1* | 6/2019 | Simon | G06F 11/3688 |
| 2020/0301763 | A1* | 9/2020 | Chandoor | G06F 9/44505 |

* cited by examiner

*Primary Examiner* — Marina Lee
(74) *Attorney, Agent, or Firm* — Sterne, Kessler, Goldstein & Fox P.L.L.C.

(57) ABSTRACT

Disclosed herein are system, method, and computer program product embodiments for providing the ability to generate unit tests for a web service from a logged interaction with the web service and an API specification for the web service. Rather than having to manually generate tests for the web service, a test developer may interact with the web service through a web browser and record a log of these interactions. The log is then matched to a definition of the API specification, and a test is created. The test developer can either run this test against the web service, or use the test as a foundation for developing and refining the test further.

20 Claims, 4 Drawing Sheets

TEST SUITE GENERATION FROM METADATA

BACKGROUND

Representational state transfer (REST) web services (or, RESTful web services) are services satisfying several core principles of REST, such as the use of stateless operations, client-server relationships, and unique identification of resources through a uniform resource identifier (URI). Commonly, requests to these RESTful web services are made through Hypertext Transfer Protocol (HTTP) requests, that include instructions such as GET (to read a resource at a URI), PUT (to update a resource at the URI), DELETE (to remove a resource at the URI), and POST (to create a new resource).

These services may be developed and implemented in conformance with the use of an Application Program Interface (API). The API defines how requests are made and answered by the service. Developers can generate APIs through the use of API specifications, which in the context of RESTful web services are often defined in languages such as RESTful API Modeling Language (RAML) or OpenAPI Specification (OAS).

Testing a RESTful web service API (REST API) is commonly handled by generating test suites, commonly with tools such as Apache JMeter, JUnit, or Blackbox API Tester (BAT). However, generating test suites with each of these tools requires manually defining test parameters and conditions.

Accordingly, what is needed are automated tools for testing REST APIs.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for rapid generation of test suites for verifying the operation of REST APIs.

In order to test REST APIs, a testing framework such as Apache JMeter (for example) may be used to write tests, as well as to compile multiple tests into a test suite. A testing framework allows for connection to a service, such as a RESTful web service, and the sending of requests to the service in order to receive a response. That response can then be tested against constraints to determine whether the response is or is not what was expected.

While REST API testing frameworks allow for robust implementation of tests and test suites, a test developer must still envision all of the testing scenarios and write the tests specific to a particular API. This requires drafting a test for each possible use case, specific for a particular API. And, if testing multiple APIs, this becomes an exponentially complex problem for test development.

In some cases, the API may have been designed and generated through the use of an API specification, such as RAML or OAS by way of non-limiting example. A test developer may reference the API specification in order to determine which requests to make for testing purposes, and then apply certain constraints to the received responses in order to verify correct behavior.

Figure 1:
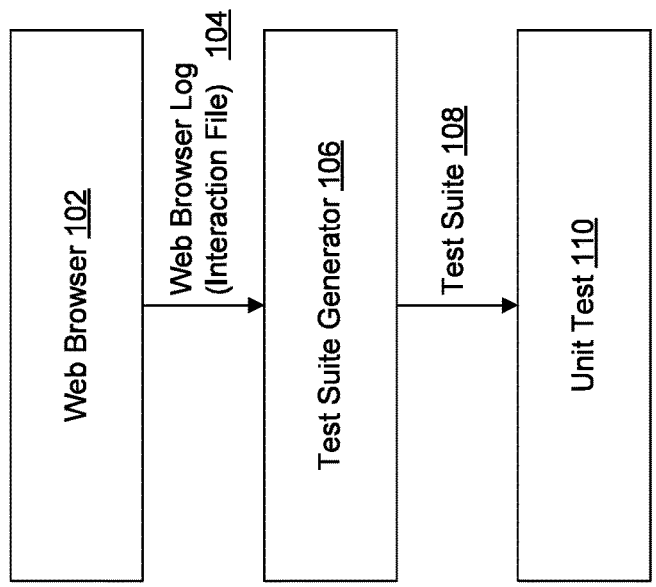
FIG. 1 illustrates a system for facilitating test suite generation, in accordance with an embodiment.

FIG. 1 illustrates a system 100 for facilitating test suite generation, in accordance with an embodiment. System 100 includes three basic components—a web browser 102, a test suite generator 106, and a unit test 110, in accordance with an embodiment. Web browser 102 is operable to connect to a service, such as a RESTful web service, and log the interaction with various calls made via the service's REST API to a log file 104. In accordance with an embodiment, this log file (or interaction file) may be provided in accordance with the HTTP Archive Format (HAR) file format.

This interaction file is provided to test suite generator 106 which generates a test suite 108 based on the interaction file and the REST API, in accordance with an embodiment. This test suite 108 can then be modified as needed and provided as a unit test 110 for testing of the service.

By providing test suite generator 106 with the capability to create a test suite 108 from an interaction file 104, and having knowledge of the REST API, the skeleton of the test suite 108 can be generated as easily as browsing a website. Whereas previously a test developer would have had to envision every possible test case needed in test suite 108 in order to manually create those test cases, the test developer (or other users) can use the web site (e.g., the RESTful web service) as a normal user and put the web site through its paces in a variety of use cases. In interacting with the web site as a normal user, the test developer can rapidly develop test cases that match expected use cases.

Figure 2:
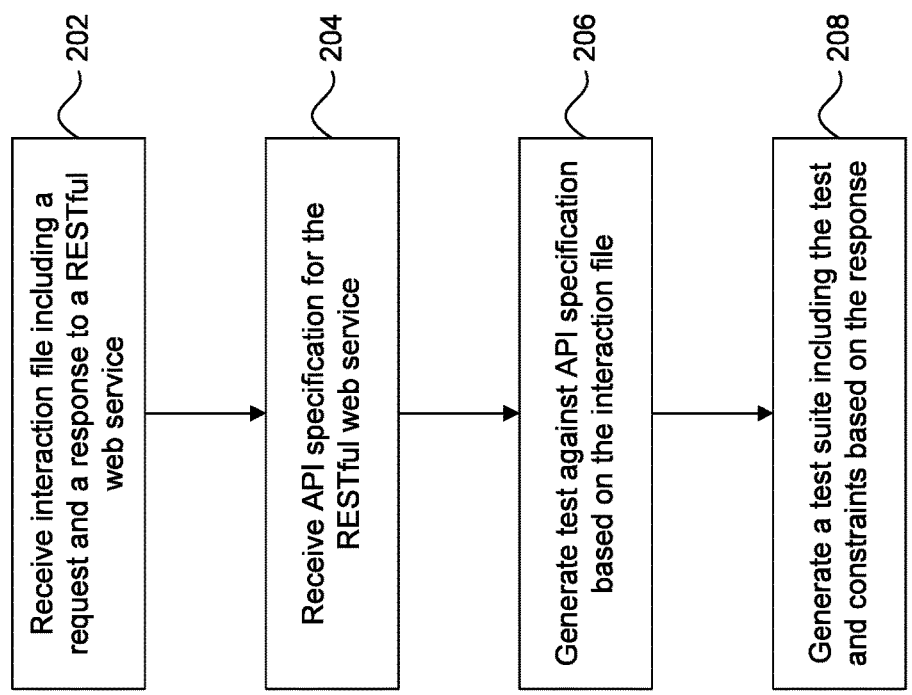
FIG. 2 is a flowchart illustrating steps by which the test suite is generated, in accordance with an embodiment.

FIG. 2 is a flowchart 200 illustrating steps by which the test suite is generated, in accordance with an embodiment. In accordance with an embodiment, these steps are performed by a test suite generator, such as test suite generator 106 of FIG. 1. However, one skilled in the relevant arts will appreciate that these steps may be performed by any combination of software and/or hardware components.

The method begins at step 202 where an interaction file (e.g., a HAR file) is received. The interaction file includes a request made to a RESTful web service, and the response received to the request, in accordance with an embodiment. In accordance with an embodiment, the interaction file is stored in a markup language defining metadata regarding the interactions with the web service. One skilled in the relevant art will appreciate that the interaction file may include additional information, including multiple additional requests and responses, status codes, additional metadata, etc.

For example, a request may be made of the service for an employee record that includes the employee's ID expressed as an integer, the employee's name expressed as a string, the employee's age expressed as an integer, and the employee's salary expressed as a double. An individual record returned for a request to the service for the employee record with the employee ID '4530' might therefore look like this:

ID: 4530
Name: Joe Smith
Age: 57
Salary: 101500.20

Additionally, the response may include an HTTP status code, such as '200' (OK), '403' (Forbidden), or '404' (Not Found). The request, information contained in the request, and the response (including a status code), and any additional related information or portion thereof, may be included in the interaction file.

In this example, submitting the request to the web service for logging may be as straightforward as enabling logging in a web browser, navigating the web browser to a URI location of the web service, and entering the information needed to perform the request. For example, a web page built around an employee record locator may provide a field for entering an employee ID, and a button for submitting a request to the web service to show the employee record associated with the entered employee ID. By performing this interaction, the web browser would log each aspect of this request and response in an interaction file (e.g., a HAR file). One skilled in the relevant arts will appreciate that standard logging implementations available in modern web browsers are contemplated as within the scope of this disclosure.

At step 204, an API specification for the RESTful web service is received, in accordance with an embodiment. For example, the API specification may be provided in a RAML format, which in order to support the above request may have parameters such as:

/employees:
/{employeeID}
  Description: Retrieve an employee record by ID
  get:
    queryParameters:
      employeeName:
        displayName: Employee Name
        type: string
      employeeAge:
        displayName: Employee Age
        type: number
      employeeSalary:
        displayName: Employee Salary
        type: number The exemplary API specification above provides that a request made to the RESTful web service for a particular employeeID will provide a response with the name, age, and salary of the corresponding employee.

At step 206, with both the interaction file and API specification in hand, it is possible to match the actual request logged in the interaction file with the API specification in order to generate the test. Using the API specification, it is possible to filter out only the relevant information from the interaction file (e.g., URIs that are being tested) to generate the test. In accordance with an embodiment, this test may be generated in accordance with a test framework, such as BAT, JUnit, or Apache JMeter, although one skilled in the relevant art will appreciate that other test mechanisms may be provided.

The API specification may include example nodes, which provide examples for how interactions with the API should be carried out. In accordance with an embodiment, payloads and testing data may be generated using the API specification example nodes.

At step 208, this test and others may be compiled into a test suite, which include the test and any constraints based on the response obtained from the interaction file, in accordance with an embodiment. Continuing the above example, a test with constraints may be in the form:

```
GET '[URI for service endpoint]'
    headers: {
        'Content-Type': 'application/json'
    },
    body: {
        "employeeID": "4530",
    }
} assert [
    $.response.body.employeeName mustEqual "Joe Smith"
    $.response.body.employeeAge mustEqual "57"
    $.response.body.employeeSalary mustEqual "101500.20"
]
```

In short, the test suite is generated by mapping the actual request made and logged in the interaction file to the inputs provided by the API specification, and providing constraints on the response in accordance with what has been logged by the inputs. In the above example, the test provides employeeID 4530 as an input, and expects the specific employee record associated with Joe Smith as logged in the interaction file. The expected results are provided, by way of non-limiting example, as assertions in the above example.

In accordance with a further embodiment, additional constraints may be included, such as requirements on the format of the response (e.g., $.response.headers.'Content-Type' mustEqual 'application/xml') and on the state of the HTTP request (e.g., $.response.status mustEqual 200 to require an OK status) as additional assertions.

With the above test in place, it is possible to run the test file against the web service to verify that the responses are as expected (e.g., satisfy any constraints). The result, including any failed constraints, can then be provided to the test developer executing the test (or a complete test suite) to identify any issues with the API.

Notably, even if the generated tests are not used explicitly as generated, the resulting test suite serves as a skeleton for further rapid development of test conditions. For example, if the above results are incorrect as logged, a test developer may edit the test suite manually in order to easily enter the correct value for the results. And, a test developer may add or remove certain constraints as needed in order to test for other conditions without needing to generate all of the test conditions manually.

Figure 3:
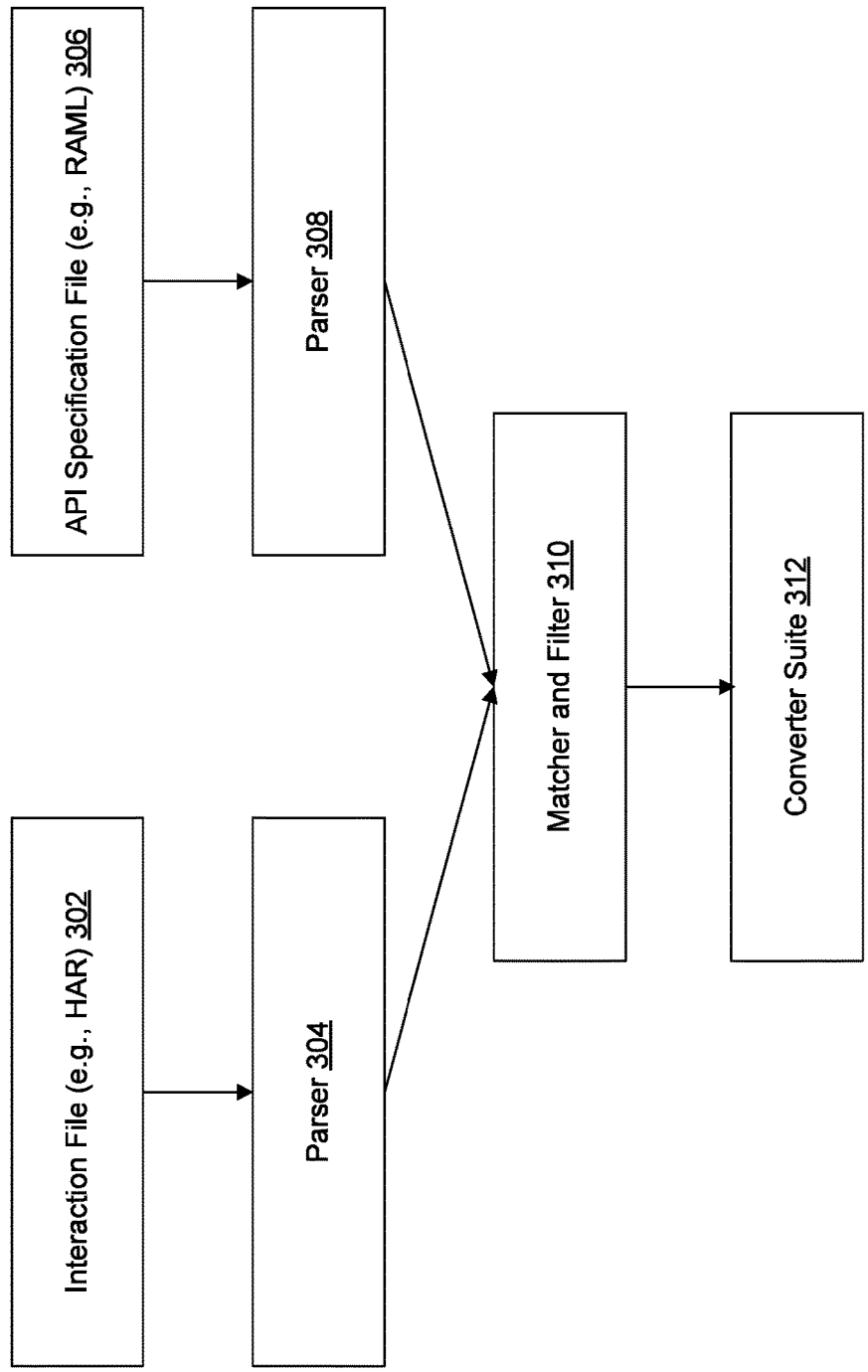
FIG. 3 illustrates an exemplary architecture for a test suite generator, in accordance with an embodiment.

FIG. 3 illustrates an exemplary architecture for a test suite generator 300, in accordance with an embodiment. This architecture shows a specific modularization of the test suite generator 300 configured to perform the methods described herein, such as that illustrated in flowchart 200 of FIG. 2.

Test suite generator receives an interaction file 302 and an API specification file 306. Each of these files may then be parsed through parser 304 and parser 308, respectively, to identify individual elements of each (e.g., markup elements). With a parsed interaction file 302 and a parsed API specification file 306, it is possible to match and filter elements of each file through matcher and filter 310 to match interactions with the API and inputs and outputs provided by the parsed interaction file to specific calls in the API specification, in accordance with an embodiment.

Converter suite 312 may then convert these relationships into a test. For example, converter suite 312 may produce a test in Apache JMeter, JUnit, or Bat format. The resulting test is then output by test suite generator 300, or combined with other tests to produce a complete test suite.

Figure 4:
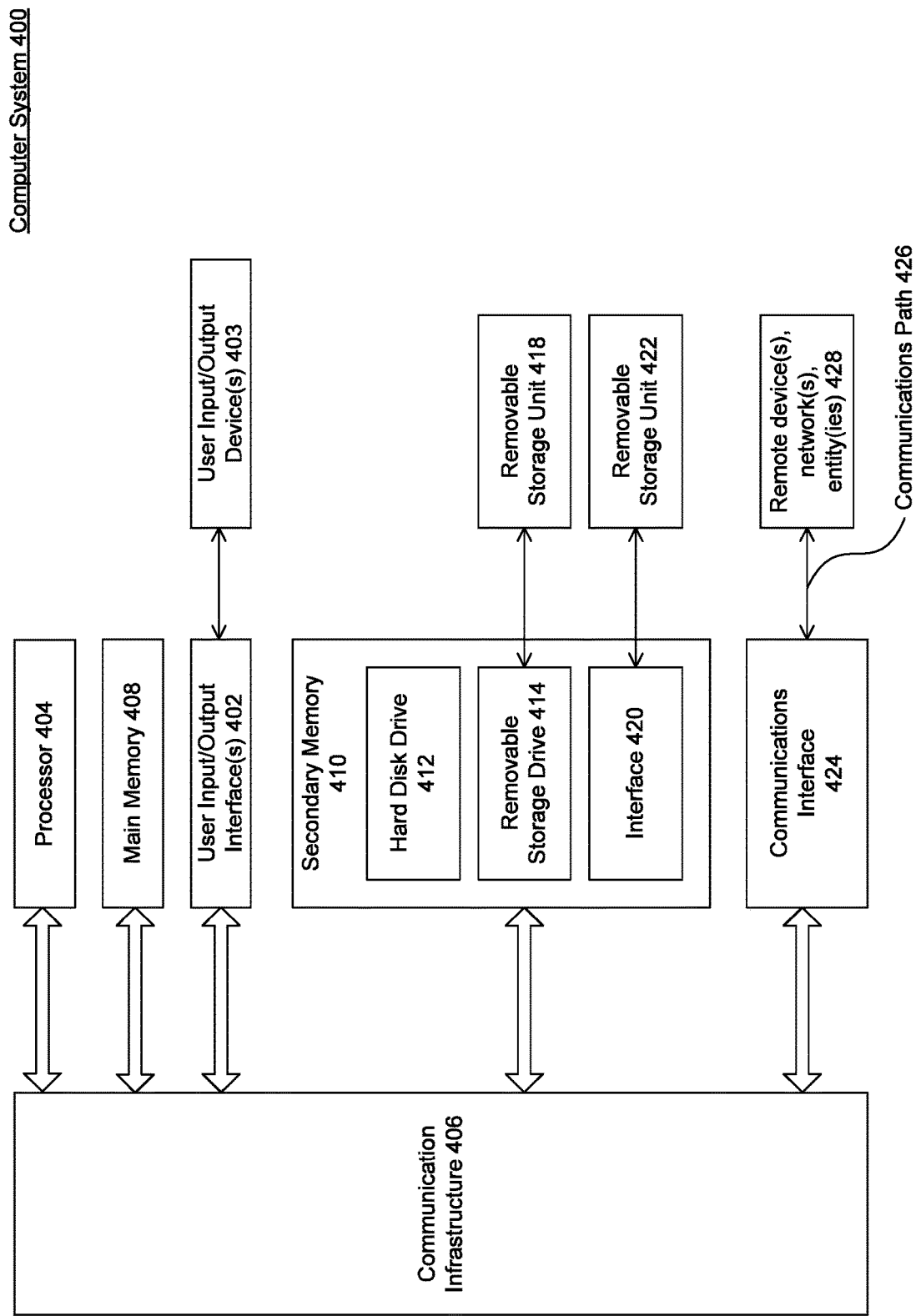
FIG. 4 is an example computer system useful for implementing various embodiments.

Various embodiments may be implemented, for example, using one or more well-known computer systems, such as computer system 400 shown in FIG. 4. One or more computer systems 400 may be used, for example, to implement any of the embodiments discussed herein, as well as combinations and sub-combinations thereof.

Computer system 400 may include one or more processors (also called central processing units, or CPUs), such as a processor 404. Processor 404 may be connected to a communication infrastructure or bus 406.

Computer system 400 may also include customer input/output device(s) 403, such as monitors, keyboards, pointing devices, etc., which may communicate with communication infrastructure 406 through customer input/output interface(s) 402.

One or more of processors 404 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 400 may also include a main or primary memory 408, such as random access memory (RAM). Main memory 408 may include one or more levels of cache. Main memory 408 may have stored therein control logic (i.e., computer software) and/or data.

Computer system 400 may also include one or more secondary storage devices or memory 410. Secondary memory 410 may include, for example, a hard disk drive 412 and/or a removable storage device or drive 414. Removable storage drive 414 may be a floppy disk drive, a magnetic tape drive, a compact disk drive, an optical storage device, tape backup device, and/or any other storage device/drive.

Removable storage drive 414 may interact with a removable storage unit 418. Removable storage unit 418 may include a computer usable or readable storage device having stored thereon computer software (control logic) and/or data. Removable storage unit 418 may be a floppy disk, magnetic tape, compact disk, DVD, optical storage disk, and/any other computer data storage device. Removable storage drive 414 may read from and/or write to removable storage unit 418.

Secondary memory 410 may include other means, devices, components, instrumentalities or other approaches for allowing computer programs and/or other instructions and/or data to be accessed by computer system 400. Such means, devices, components, instrumentalities or other approaches may include, for example, a removable storage unit 422 and an interface 420. Examples of the removable storage unit 422 and the interface 420 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 400 may further include a communication or network interface 424. Communication interface 424 may enable computer system 400 to communicate and interact with any combination of external devices, external networks, external entities, etc. (individually and collectively referenced by reference number 428). For example, communication interface 424 may allow computer system 400 to communicate with external or remote devices 428 over communications path 426, which may be wired and/or wireless (or a combination thereof), and which may include any combination of LANs, WANs, the Internet, etc. Control logic and/or data may be transmitted to and from computer system 400 via communication path 426.

Computer system 400 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 400 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 400 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 400, main memory 408, secondary memory 410, and removable storage units 418 and 422, as well as tangible articles of manufacture embodying any combination of the foregoing. Such control logic, when executed by one or more data processing devices (such as computer system 400), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 4. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A method, comprising:
   receiving, by one or more computing devices, an interaction file comprising a request from a client to an application programming interface (API) on a web service, and a response to the request from the web service;
   receiving, by the one or more computing devices, a specification of the API;
   generating, by the one or more computing devices, a test request to the web service using the request from the interaction file configured to satisfy the specification of the API; and
   generating, by the one or more computing devices, a test suite comprising the test request and a constraint, wherein the constraint is set using the response from the interaction file.

2. The method of claim 1, further comprising:
   executing, by the one or more computing devices, the test suite on the web service, wherein the test suite is configured to apply the constraint against a test response received from the web service.

3. The method of claim 1, wherein the interaction file is generated by a web browser logging an interaction with the web service.

4. The method of claim 1, wherein generating the test request comprises:
   matching, by the one or more computing devices, the request from the interaction file to an API call defined by the specification of the API.

5. The method of claim 1, further comprising:
   providing, by the one or more computing devices, the test suite for manual editing.

6. The method of claim 1, further comprising:
   generating, by the one or more computing devices, an additional test request; and
   including, by the one or more computing devices, the additional test request in the test suite.

7. The method of claim 1, wherein the specification of the API is defined in a REpresentational State Transfer (REST)-ful API Modeling Language (RAML) file.

8. A system, comprising:
   a memory configured to store operations; and
   one or more processors configured to perform the operations, the operations comprising:
      receiving an interaction file comprising a request from a client to an application programming interface (API) on a web service, and a response to the request from the web service,
      receiving a specification of the API,
      generating a test request to the web service using the request from the interaction file, configured to satisfy the specification of the API, and
      generating a test suite comprising the test request and a constraint, wherein the constraint is set using the response from the interaction file.

9. The system of claim 8, the operations further comprising:
   executing the test suite on the web service, wherein the test suite is configured to apply the constraint against a test response received from the web service.

10. The system of claim 8, wherein the interaction file is generated by a web browser logging an interaction with the web service.

11. The system of claim 8, wherein generating the test request comprises:
    matching the request from the interaction file to an API call defined by the specification of the API.

12. The system of claim 8, the operations further comprising:
    providing the test suite for manual editing.

13. The system of claim 8, the operations further comprising:
    generating an additional test request; and
    including the additional test request in the test suite.

14. The system of claim 8, wherein the specification of the API is defined in a Representational State Transfer (REST)-ful API Modeling Language (RAML) file.

15. A non-transitory computer readable storage device having instructions stored thereon, execution of which, by one or more processing devices, causes the one or more processing devices to perform operations comprising:
    receiving an interaction file comprising a request from a client to an application programming interface (API) on a web service, and a response to the request from the web service;
    receiving a specification of the API;
    generating a test request to the web service using the request from the interaction file configured to satisfy the specification of the API; and generating a test suite comprising the test request and a constraint, wherein the constraint is set using the response from the interaction file.

16. The non-transitory computer readable storage device of claim 15, the operations further comprising:
executing the test suite on the web service, wherein the test suite is configured to apply the constraint against a test response received from the web service.

17. The non-transitory computer readable storage device of claim 15, wherein the interaction file is generated by a web browser logging an interaction with the web service.

18. The non-transitory computer readable storage device of claim 15, wherein generating the test request comprises:
matching the request from the interaction file to an API call defined by the specification of the API.

19. The non-transitory computer readable storage device of claim 15, the operations further comprising:
providing the test suite for manual editing.

20. The non-transitory computer readable storage device of claim 15, the operations further comprising:
generating an additional test request; and
including the additional test request in the test suite.

\* \* \* \* \*